Oct. 21, 1941.  C. C. COONS  2,260,212
REFRIGERATION
Filed July 20, 1938   2 Sheets-Sheet 1

INVENTOR
Curtis C. Coons
BY
Harry S. Dumasse
ATTORNEY

Oct. 21, 1941.          C. C. COONS           2,260,212
                        REFRIGERATION
                     Filed July 20, 1938      2 Sheets-Sheet 2

INVENTOR
Curtis C. Coons
BY
Harry S. Demarest
ATTORNEY

Patented Oct. 21, 1941

2,260,212

UNITED STATES PATENT OFFICE 2,260,212

REFRIGERATION

Curtis C. Coons, North Canton, Ohio, assignor to The Hoover Company, North Canton, Ohio, a corporation of Ohio Application July 20, 1938, Serial No. 220,184

28 Claims. (Cl. 62—5)

This invention relates to refrigerating apparatus and more particularly to an absorption refrigerating system for domestic use provided with an evaporator which is divided into distinct ice freezing, box cooling, and low temperature freezing or storage sections.

According to the invention, there is provided a refrigerating system having an evaporator provided with three freezing sections, namely, a low temperature section which operates in an insulated eutectic mixture to maintain a very low dessert freezing or storage temperature in a freezing or storage chamber, a section which operates at a temperature sufficiently low to freeze water contained in a tank with which this section of the evaporator is in thermal contact at a plurality of spaced points, and a third section which operates as a box cooling element and normally is maintained at a temperature above the freezing point of water.

More specifically, the invention relates to a three fluid absorption refrigerating system in which the inert gas is positively propelled through a circuit and functions simultaneously to elevate absorption liquid from the boiler level to the upper portion of the absorber and to propel the liquid refrigerant through all portions of the evaporator. The system is characterized by the fact that the condenser need not extend above the evaporator, but may have its lower portion substantially co-extensive with a large portion of the evaporator. The arrangement is such that all portions of the evaporator may be placed at the highest possible level in the refrigerator storage compartment thereby to insure proper cooling of the air in the storage compartment and the mot economical utilization of the space in such compartment.

It is another object of the invention to provide a refrigerating system characterized by the fact that ice is continuously produced whenever there is a demand therefor and box cooling is made subservient to demands for ice production.

The invention is further distinguished by the fact that it is continuously defrosting and drainage is automatically and continuously removed from the refrigerating compartment without requiring any action on the part of the operator.

It is a further object of the invention to provide a refrigerating system to which energy is supplied in the form of heat and through the medium of a circulating element, all of which are simultaneously and properly controlled to produce ice, and to maintain the storage compartment temperature within safe limits.

It is another object of the invention to provide an evaporator having a plurality of sections including box cooling, ice freezing, and low temperature storage elements.

It is a further object of the invention to provide a refrigerating system having an evaporator provided with an insulated low temperature freezing compartment which contains a cold storage element whereby desserts may be frozen or foodstuffs stored at very low temperatures.

Other objects and advantages of the invention will become apparent as the description proceeds when taken in connection with the accompanying drawings, in which.

Figure 1:
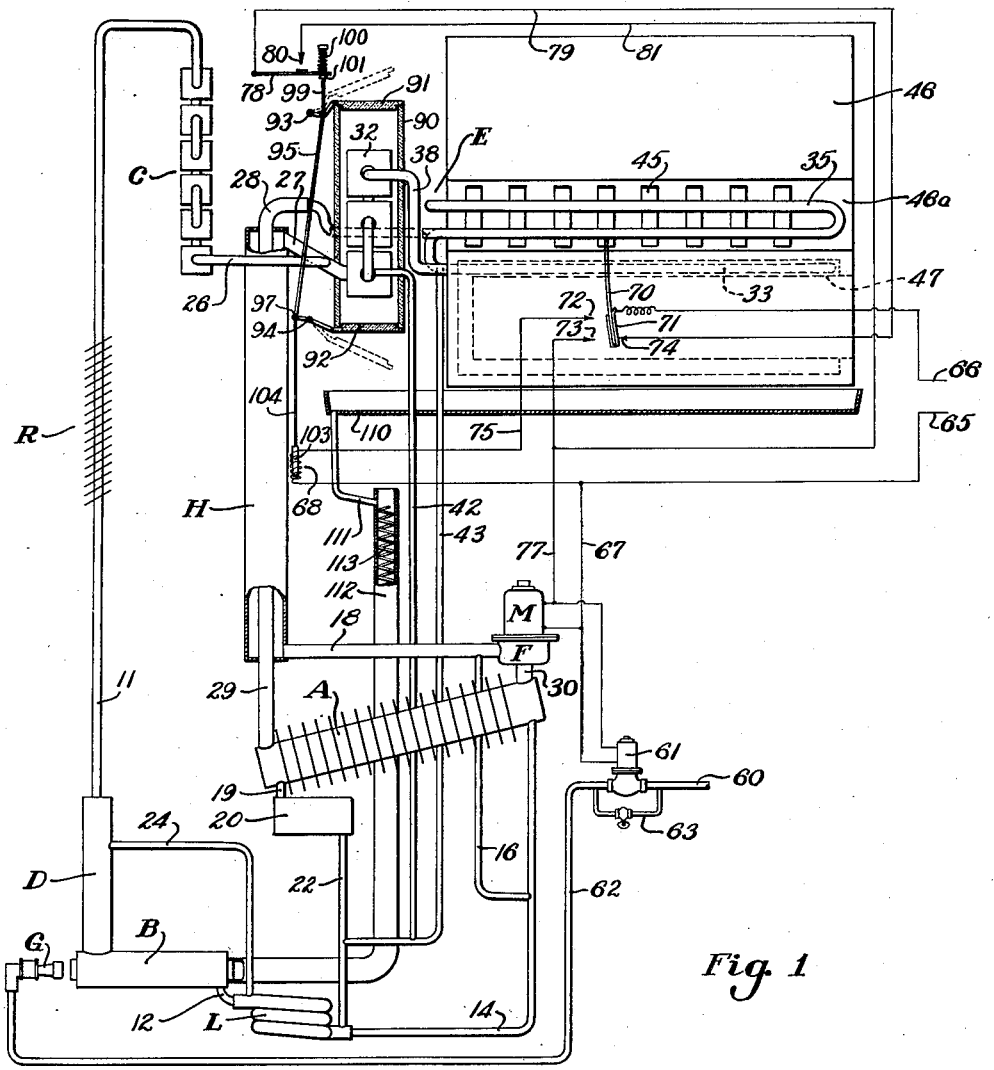
Figure 1 is a diagrammatic representation of a refrigerating system embodying my invention.

Referring now to the drawings in detail and first to Figure 1 thereof, it will be seen that I have illustrated my invention as being applied to a continuous three fluid absorption refrigerating system embodying a boiler B, an analyzer D, a condenser C, an evaporator E, a gas heat exchanger H, an absorber A, a liquid heat exchanger L, and a circulating fan F driven by an electrical motor M. These elements are suitably interconnected by various conduits, to be described more fully hereinafter, to form a complete refrigerating system.

The apparatus is charged with a refrigerant such as ammonia, an absorbent such as water, and a pressure equalizing medium such as nitrogen.

The boiler B is heated in any suitable manner, in the present instance, a gas burner G is shown as being in position to heat the boiler.

The application of heat to the boiler B expels refrigerant vapor from the refrigerant absorption solution therein contained which vapor passes upwardly through the analyzer in counterflow relationship to strong absorption solution flowing downwardly therethrough. Refrigerant vapor is generated in the analyzer from the strong solution, the necessary heat being supplied by condensation of vapor of absorption solution generated in the boiler. The refrigerant vapor passes from the analyzer to the upper portion of the condenser C through a conduit 11 which includes the air-cooled rectifier R. The rectifier serves to condense any vapor of absorption solution which may pass through the analyzer.

The weak solution formed in the boiler by the generation of refrigerant vapor is conveyed therefrom through a conduit 12, liquid heat exchanger L, and a conduit 14 to the upper portion of the air-cooled absorber A. It is apparent that the upper end of the absorber A is at an elevation considerably above the liquid level normally prevailing in the boiler-analyzer system; therefore, some means must be provided to elevate the weak solution into the absorber. For this purpose, a small diameter bleed-off conduit 16 is connected between the discharge conduit 18 of the circulating fan F and the conduit 14 below the liquid level therein whereby the weak solution is pumped into the absorber by gas-lift action. The weak solution flows downwardly through the absorber in counterflow relationship to a mixture of pressure equalizing medium and refrigerant vapor which is supplied to the bottom portion of the absorber in a manner to be described hereinafter. The refrigerant vapor content of the pressure equalizing medium is absorbed by the weak solution which thereby becomes strong solution. The heat of absorption is rejected to the surrounding air through the cooling fins on the absorber vessel. The strong solution is drained from the bottom of the absorber through a conduit 19 into a reservoir 20. From the reservoir 20, the strong solution is conveyed through a conduit 22, the liquid heat exchanger L, and a conduit 24 into the upper portion of the analyzer D.

The refrigerant vapor which is supplied to the upper portion of the condenser C is liquefied therein by heat exchange with air. The condenser C may be of any desired type but it preferably consists of a reversely bent series of conduits provided with air-cooling fins. The liquid refrigerant formed in the condenser is conveyed therefrom through a conduit 26 into an inert gas supply conduit 27 which connects to the bottom portion of the evaporator E. The evaporator will not be described in detail at this point; for the present it is sufficient to state that the refrigerant evaporates into the inert gas to produce refrigeration in the evaporator, and the resulting strong or rich mixture of inert gas and refrigerant vapor is conveyed from the evaporator to the bottom portion of the absorber A through a conduit 28, the gas heat exchanger H, and a conduit 29. The inert gas refrigerant vapor mixture passes upwardly through the absorber in counterflow relationship to absorption solution in the manner previously described. The lean pressure equalizing medium formed in the absorber is conveyed therefrom into the suction inlet of the fan F through a conduit 30. The inert gas is placed under pressure by the fan F and is discharged therefrom through conduit 18, gas heat exchanger H and the conduit 27 into the evaporator.

Referring now to Figures 1 to 4, the evaporator is illustrated as comprising a vertically positioned finned box-cooling section 32, a horizontally positioned U-shaped fast freezing section 33, and a pair of U-shaped ice-freezing sections 34 and 35.

The box-cooling evaporator section 32, as illustrated, comprises three horizontal conduits of relatively large diameter 36 which are serially connected by U-shaped riser conduits 37 of a smaller diameter. Each conduit 37 opens into the bottom portion of the lower of the two conduits 36 with which it is associated and into the top portion of the higher of said two conduits. The highest end of the box-cooling evaporator section is connected to the fast-freezing evaporator section 33 by a downwardly extending conduit 38. The leg of the U-shaped fast-freezing evaporator 33 not connected to the conduit 38 is connected by a rising inclined conduit 39 with the bottom leg of the U-shaped ice-freezing evaporator section 34. The other leg of the evaporator section 34 is connected to the top leg of the U-shaped ice-freezing evaporator section 35 by a horizontal conduit 40 extending adjacent and parallel to the box-cooling evaporator 32. The rich gas discharge conduit 28 connects directly to the lowest element of the U-shaped evaporator section 35.

The liquid refrigerant moves through the evaporator conduits 36 by reason of a slight inclination thereof and also due to the impetus provided by the inert gas stream passing over the liquid. However, the inert gas velocity and density in the conduit sections 37 is so great that the inert gas sweeps or blasts the liquid refrigerant upwardly therethrough into the next higher conduit section 36 while refrigeration is being produced. All conduit sections of the evaporator, excepting only the conduit sections 36, are of relatively small diameter whereby the inert gas stream travels therethrough at a relatively high velocity; a velocity having a magnitude sufficient to sweep the liquid refrigerant through all sections of the evaporator, excepting conduits 36, as the evaporating process is occurring. The broad concept of propulsion of the liquid refrigerant through the evaporating zone by the inert gas, as above described, is disclosed and claimed in the co-pending application of Curtis C. Coons and William H. Kitto, Serial No. 386,395, filed April 2, 1941, which is a continuation-in-part of application Serial No. 220,189, filed July 20, 1938.

In order to prevent liquid refrigerant from completely blocking the lowest rising conduit 37 and the riser conduit 39, these horizontal conduits are provided with drain conduits 42 and 43 which connect to the rich solution return conduit 22. The conduits 42 and 43 open into the upper portions of these horizontal conduits in order that liquid refrigerant may collect in such conduits so long as it does not completely block them. This is highly advantageous for the reason that there is always a considerable quantity of liquid refrigerant in the condenser and a considerable quantity being elevated through the evaporator whenever the apparatus is stopped by the control mechanism, which liquid will of course flow downwardly by gravity into the lower portions of the evaporator when the circulating fan F is de-energized. By positioning the drain conduits 42 and 43 in the manner above described, this drain liquid is not wasted but is simply stored for the next cycle, only that portion of the same is drained which might block the conduit to inert gas flow or tend to render the apparatus inoperative.

The U-shaped ice-freezing evaporator sections 34 and 35 are inclined slightly to the horizontal and are provided with a plurality of spaced apart freezing plates 45. A shallow water tank 46 having a tapered bottom portion 46a rests upon the inclined freezing plates 45 whereby ice blocks will be frozen on those portions of the tapered bottom portion 46a of the ice tank 46 which are in direct thermal contact with the freezing plates 45.

The fast freezing evaporator coil 33 is adapted to refrigerate a compartment 47 which comprises an outer wall portion 48, an insulating blanket 49, an intermediate wall portion 50, an inner wall portion 51. The wall portion 50 forms a chamber in conjunction with the wall portion 51, which contains a eutectic mixture 52.

The eutectic mixture 52 may be any desired combination of liquids and/or solids possessing the desired properties of high specific heat and low phase-change temperatures. A 23% by weight solution of sodium chloride in water forms a satisfactory mixture where the temperatures of the eutectic mixture are not to be carried below 0° F.

The evaporator coil 33 is positioned within the eutectic mixture 52 between the walls 51 and 50 and at the upper corners thereof. When refrigeration is produced in the coil 33, the temperature of the eutectic mixture is lowered to substantially 10 degrees Fahrenheit and is maintained at that temperature by reason of the thermal fly wheel effect thereof. Due to the fact that the refrigeration is applied at the upper portion of the body of the eutectic mixture, the temperature gradient is substantially equal throughout the area of the inner wall 51 of the compartment 47, thereby insuring a reasonably uniform temperature condition within that compartment. The compartment 47 will be provided with a suitable heavily insulated door, not shown, in order to prevent heat leakage thereinto. The outer walls of the compartment 47 do not reach a materially low temperature; they are normally maintained at a temperature substantially the same as the temperatures normally prevailing within the food storage compartment of the refrigerating cabinet.

Figure 5:
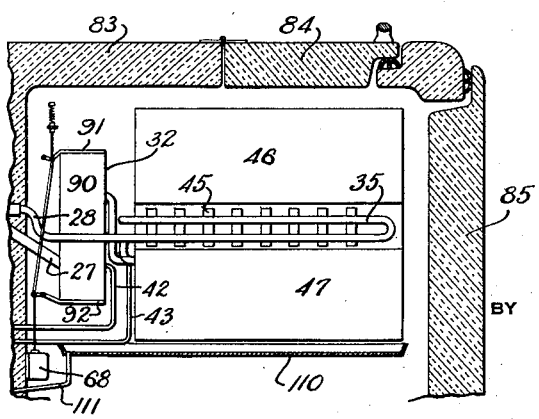
Figure 5 is a cross-sectional elevational view drawn to a small scale illustrating the manner in which the evaporator is mounted in a refrigerator cabinet.
Figure 2:
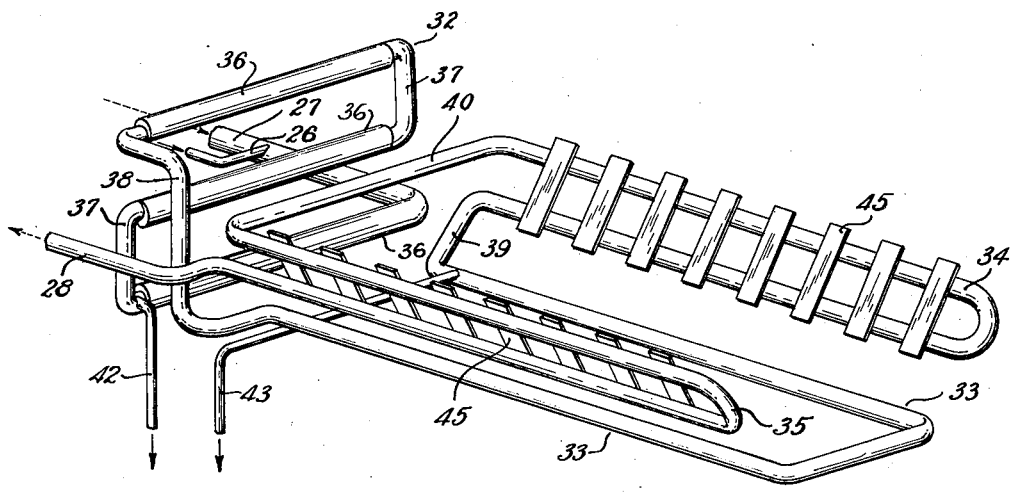
Figure 2 is a perspective view illustrating the evaporator of my invention.
Figure 3:
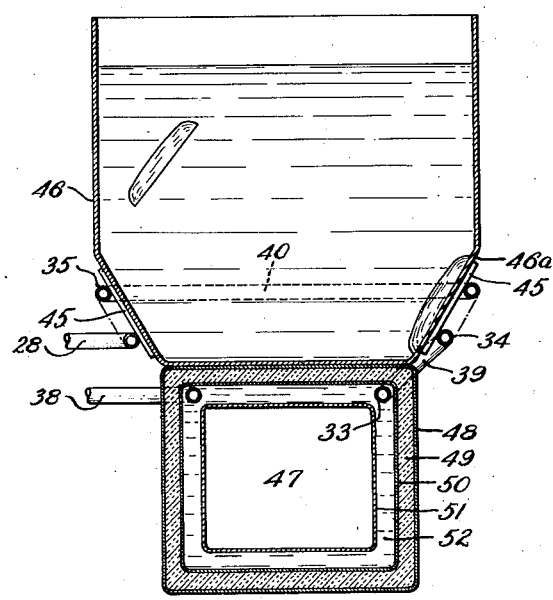
Figure 3 is an elevational view illustrating in cross-section the structure of the freezing compartment and the water tank.
Figure 4:
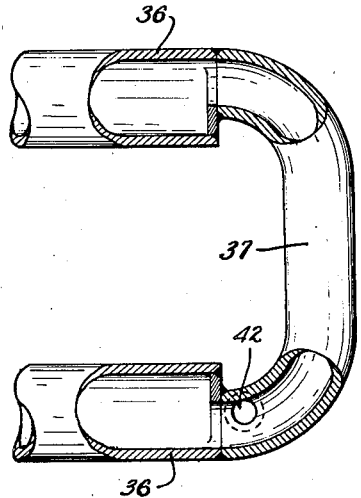
Figure 4 is a fragmentary detail of a portion of the evaporator.

The mounting of the evaporator section and fast-freezing compartment in the cabinet 83 is illustrated in Figure 5. The box-cooling evaporator section 32 is positioned adjacent the rear wall of the cabinet and at the top portion thereof, and is substantially hidden by the shallow water tank 46 and the fast-freezing compartment 47 which are positioned directly in front thereof. The cabinet is provided with a top door 84 which provides a readily accessible means for pouring water into the tank 46; however, the tank 46 may be removed from the freezing plates 45 simply by sliding the same forwardly through the front door 85 of the cabinet 83.

Referring now to Figure 1, the control mechanism will be described in detail. Fuel is supplied to the burner G through a supply conduit 60, a solenoid valve 61, and a conduit 62. A suitable by-pass 63 is provided around the solenoid valve 61 in order to maintain a pilot or igniting flame on the burner G during those periods when the valve 61 is in closed position. Electrical energy is supplied to the apparatus from a suitable source of supply through a pair of wires 65 and 66. The wire 65 is connected directly to the solenoid valve 61 and the motor M through a wire 67. The line 65 also connects directly to a solenoid 68 which will be more fully described hereinafter. A suitable thermostatic switch mechanism is mounted in any preferred manner to be responsive to temperature conditions prevailing at any one of the freezing plates 45. This switch may be of any preferred form and may be housed in any manner desired; however, as shown, it consists of a bimetallic element 70 mounted upon one of the plates 45 in order to have good thermal contact therewith. The free end of the bimetallic element 70 carries a U-shaped contact strip 71 which is suitably insulated therefrom. The line 66 connects directly to the contact strip 71. The contact strip 71 is arranged to contact a pair of contacts 72 and 73 when it is flexed to the left, as viewed in Figure 1, or to contact a contact point 74 when it is flexed to the right, as viewed in Figure 1. The contact 72 is connected directly to the solenoid coil 68 through a wire 75 and the contact 73 connects directly to the solenoid valve 61 and to the motor M through a wire 77. The contact 74 is connected through a wire 79 to a bimetallic element 78 which is positioned to be responsive to temperature conditions of the air within the refrigerating compartment. The bimetallic element 78 also constitutes an electrical switch and is adapted to contact a contact point 80 which is connected through a wire 81 to the wire 77 which connects to the contact 73.

The box-cooling coil 32 is completely encased in a heavily insulated housing 90 which is provided at its top and bottom portions with movable plate valves 91 and 92, respectively. The plates 91 and 92 are pivotally mounted at 93 and 94 by means of arms which are rigidly attached thereto. An actuating link 95 is pivotally connected to the supporting arm of the plate valve 91 on the evaporator side thereof and it is also pivotally connected at 97 to the supporting arm of the plate valve 92 outwardly of the pivot 94. The bimetallic thermostat 78 slidably receives an actuating rod 99 which carries a spring 100 bearing against the upper face of the element 78 and a fixed collar 101 bearing against the under face thereof. The solenoid plunger 103, which is actuated by the solenoid coil 68, is connected by a rod 104 to the pivot point 97 on the arm supporting the valve plate 92.

The operation of the control mechanism is as follows: Assuming that the apparatus has been out of operation and that temperature conditions are such as to indicate a demand for refrigeration in the storage compartment and on the ice-freezing evaporator, the thermostat 78 will flex upwardly thereby moving the plate valves 91 and 92 from engagement with the cabinet 90 to permit air to flow across the box-cooling evaporator coil. However, under these conditions the thermostat 70 will have flexed to the left, as viewed in Figure 1, indicating a demand for refrigeration at the ice-freezing portions of the evaporator. Therefore, an electrical circuit will be made from the line 65, through the wire 67, to the solenoid valve 61, and the motor M. This circuit will be continued through the line 77 to the contact 73, contact 71, to the line 66, whereby the gas burner G and the electrical motor M are energized and refrigeration is produced. Also, a circuit will be completed through the line 65, coil 68, line 75, contact 72, contact 71, and line 66, to energize the solenoid coil 68 which will attract the solenoid plunger 103 and move the plate valves 91 and 92 to closed position against the bias of the thermostat 78 and the compression of the cushion spring 100. Refrigerant liquid will now be discharged from the condenser C into the conduit 27 through which inert gas is supplied to the evaporator. Initially, refrigeration will be produced in the box-cooling coil and will lower the temperature of that coil to such a low value that further refrigeration will not be produced therein excepting a small quantity necessary to cool the incoming gas and liquid to the low temperature prevailing in the box cooling coil, and the refrigerant liquid will simply be swept therethrough into the conduit 38 which leads to the coil 33. Due to the fact that no air can flow across the evaporator 32 and to the heavy insulation of the cabinet 90, this low temperature condition is very quickly reached. Thus, the box cooling coil serves as an evaporative pre-cooler for the liquid and gas supplied to the evaporator. Evaporation will then occur in the conduit 33 and will lower the temperature of the compartment 47 to a value in the region of 10 degrees Fahrenheit. Refrigerant not evaporated in the conduit 33 will then be propelled through the ice-freezing conduits 34 and 35 which will extract heat from the tank 46 through the freezing plates 45 and ice blocks will be formed in the interior of the tank adjacent the points of contact thereof with the plates 45. This process will continue until such time as the freezing plates 45 shall have reached a predetermined low temperature which will indicate a predetermined ice block size whereupon the thermostat 70 will flex to the right, as viewed in Figure 1, de-energizing the solenoid 68, the circulating motor M, and the solenoid valve 61. When the solenoid 68 is de-energized, the thermostat 78 will then open the plate valves 91 and 92 to permit box air to flow across the box-cooling evaporator 32, provided of course, the air within the storage compartment is of a temperature above that for which the thermostat is set. When the thermostat 78 opens the plate valves 91 and 92, it also engages the contact 80 whereby the electrical circuit is completed through the line 65, wire 67, motor M, valve 61, line 77, line 81, contact 80, bimetallic thermostat 78, line 79, contact 74, contact 71, and line 66. The motor and the valve being energized, refrigeration is produced and is continued until such period as the box air temperature shall have reached a safe value whereupon the circuit is opened because of the fact that the bimetallic thermostat 78 will move away from the contact 80 and the evaporator housing 90 will be closed to air flow. During this period, previously formed ice is melting free of the side walls of the evaporator and eventually floats to the surface of the water contained in the tank 46 from which place it may be removed with a ladle, as desired. If the ice blocks should melt free before the box temperature has reached the predetermined value, the thermostat 70 will flex to the left, as viewed in Figure 1, and will complete the circuit first mentioned and the solenoid 68 will overcome the action of the bimetallic thermostat 78 tending to permit air flow over the box-cooling evaporator 32. It is apparent from this description that demand for ice freezing takes precedence at all times over demand for box cooling. If there is no demand for box cooling or ice freezing, the refrigerating system will be completely de-energized.

When the refrigerator is initially started a very large portion of the refrigerating effect occurs within the evaporator coil 33 which is embedded in the eutectic mixture 52. This of course continues until the temperature within the compartment 47 and the eutectic mixture 52 has been lowered to the desired limit, whereupon there will be substantially no refrigeration occurring in the conduit 33 because of that low temperature, and the liquid refrigerant for the most part will simply be swept therethrough in the ice-freezing evaporator coil. There will be little further refrigeration in the compartment 47, in the absence of a refrigerating load placed therein, after its temperature is once lowered, as the heat lost through the heavily insulated walls of that compartment is comparatively negligible.

The position of the evaporator coil 33 in the eutectic mixture prevents appreciable warming thereof during periods of operation of the box cooling section 32. This is due to the fact that the coil 33 is mounted in the upper corners of a substantially rectangular body of the eutectic mixture whereby any portion of such mixture which is warmed while the box cooling coil is operative will not diffuse into the remaining colder portion of the eutectic mixture. Also, any portion of the eutectic mixture which is cooled by the coil 33 immediately sinks therebelow to maintain a uniformly low temperature in the compartment 47.

If desired, the entire water tank 46 may be encompassed in a suitable housing which will prevent contact between the tank and the air within the refrigerating compartment; however, it is frequently desirable to leave the walls of the tank exposed in order that they may aid in refrigerating the food storage compartment and to act as a thermal fly wheel to prevent the temperature of that compartment from varying excessively; though the area of the walls of the tank 46 is not sufficiently great to carry the refrigerating load of the food storage compartment at the temperature normally maintained in the tank 46.

The above described apparatus continuously defrosts itself in the following manner. During the ice-freezing period, a small amount of frost will collect on the coils 34 and 35 and upon the plates 45 but this frost will melt therefrom during the melting period; that is, the period in which the ice blocks are freeing themselves from contact with the walls of the tank 46. The small amount of frost which will be deposited upon the box-cooling coil during the closed period of the casing 90 will be melted therefrom during the box-cooling period. The very extensive area of the fins on the box-cooling coil causes that coil to operate at temperatures above the melting point of ice whenever it is carrying the box-cooling load, whereupon all frost will melt. The melted frost drips into a tray 110 which extends beneath all portions of the evaporator and is provided with a drain conduit 111 discharging into the top portion of a products of combustion flue 112 for the gas burner G. A coil spring 113 is mounted within the conduit 112 beneath the connection of the conduit 111 thereto, whereby the frost drainage spreads over the extensive surface of the coil and is quickly evaporated by the warm products of combustion discharging through the flue 112. The pilot flame which is maintained at the burner G by the by-pass conduit 63 provides sufficient heat to evaporate this drainage.

If desired, the tank may be provided with a suitable spigot whereby it may also be utilized as convenient source of cold drinking water.

In the refrigerating system herein described, the liquid refrigerant and the absorption solution are positively propelled through their respective conduits by the inert gas stream whereby the relative rates of flow of all fluids in the system are properly proportioned. This type evaporator action is particularly well suited to an evaporator of the type herein disclosed wherein it is highly desirable to pass the liquid refrigerant through the box-cooling low temperature storage and ice-freezing evaporator sections in the order named. Also, it is desirable that the ice freezing evaporator section may be positioned at an elevation higher than the elevation of the low temperature storage chamber evaporator section in order that the water tank may be positioned above the storage compartment. This is readily achieved with the evaporator herein disclosed because the inert gas stream will simply sweep or blow the liquid refrigerant not evaporated in the low temperature storage evaporator section into the ice-freezing evaporator section. Additionally, the ice-freezing evaporator sections may be coplanar and serially connected because the refrigerant and inert gas flow therethrough is positive and independent of gravity. Furthermore, the condenser may extend to an elevation substantially coextensive with the lowest elevation of the evaporator into which it discharges, it being unnecessary to supply the liquid refrigerant to a high elevation in the evaporator by reason of the fact that the liquid is positively propelled through the evaporator by the inert gas stream.

During normal operation of the apparatus, the inert gas which reaches the evaporator coil section 33 is substantially lean; that is, it contains very little refrigerant vapor, and therefore evaporation may occur at extremely low temperatures. The inert gas which normally reaches the ice-freezing evaporator is partially saturated but the saturation is not sufficient to prevent efficient and rapid evaporation of liquid refrigerant at temperatures sufficiently low to freeze water.

The eutectic mixture surrounding the storage compartment 47 has a large specific heat and is well insulated from the air within the refrigerator compartment whereby conditions within the compartment 47 are maintained substantially constant when the temperature has been lowered to the value for which the apparatus is designed.

The box-cooling evaporator section is provided with an extremely large heat transfer area whereby it may operate at high temperatures and still be able to extract large quantities of heat from the air circulating thereover; however, the box-cooling element is not called upon to carry an excessive load because some refrigeration is produced in the storage compartment by reason of the exposed walls of the water tank and the walls of the ice-freezing evaporator sections 34 and 35, though these devices are not specifically designed as air cooling elements.

While only one embodiment of the invention has been specifically described, it is to be understood that changes can be made in the form, proportion, construction and arrangement of parts without departing from the spirit of the invention or the scope of the appended claims.

I claim:

1. A refrigerating system comprising an evaporator having a box-cooling section, low temperature storage section, and an ice-freezing section all serially connected, means for supplying liquid refrigerant and a propelled stream of pressure equalizing medium to the lowest portion of said box-cooling evaporator section, the arrangement being such that the inert gas propels the liquid refrigerant through said evaporator sections serially.

2. That improvement in the art of refrigeration which includes the steps of conducting a stream of pressure equalizing medium through a path in heat exchange relation with material to be cooled and thence through a path in heat exchange relationship with a fluid to be cooled, supplying liquid refrigerant to said pressure equalizing medium, causing said pressure equalizing medium to propel said liquid refrigerant through said paths, and controlling the area of evaporation in such manner that substantially all the evaporation occurs in one path or the other.

3. Refrigerating apparatus comprising an evaporator having two ice freezing sections positioned at the same elevation, said sections being serially connected together, a plurality of spaced freezing pads on said sections, a water tank mounted on said freezing pads, and means for propelling a pressure equalizing medium and a cooling medium through said sections.

4. Refrigerating apparatus comprising a sectional cooling unit, means for supplying a cooling medium to said cooling unit, means for propelling said cooling medium and a pressure equalizing medium through said sections, means responsive to a first condition for rendering said supply and propelling means and one section of said cooling unit operative, and means responsive to a second condition for rendering said supply and propelling means and another section of said cooling unit operative, said last-mentioned means including means for rendering said one section of the evaporator inoperative independently of said means responsive to said first condition.

5. Refrigerating apparatus comprising a generator, a gas burner for heating the generator, a solenoid valve for controlling the supply of gas to said burner, an evaporator having a box-cooling section and an ice freezing section, means for supplying refrigerant generated in said generator to the lowest portion of said box-cooling section in liquid phase, means for propelling a pressure equalizing medium and refrigerant liquid through said evaporator sections, an insulated box enclosing said box-cooling section, valves for controlling the flow of air through said box, a thermostatic mechanism for opening and closing said valves in response to changes in box temperature, thermostatic means for energizing said burner and said propelling means in response to a demand for refrigeration at said ice-freezing evaporator section and for conditioning said burner and propelling means for energization by said first-mentioned thermostatic means when there is no demand for ice-freezing at said ice-freezing evaporator section, and means energized by said second-mentioned thermostatic means in response to a demand for refrigeration for closing said valves independently of said first-mentioned thermostatic means.

6. Refrigerating apparatus comprising an evaporator having a plurality of distinct sections, means for propelling an inert gas through said sections, means for supplying liquid refrigerant to said evaporator adjacent the point of inert gas supply, the arrangement being such that the refrigerant is propelled through said evaporator by the inert gas as it evaporates thereinto, said evaporator sections including box-cooling and ice-freezing sections, and means for selectively rendering operative different sections of said evaporator.

7. An evaporator comprising an air cooling element, a low temperature fast freezing element and an ice-freezing element, said air cooling element and said fast freezing element being thermally isolated from each other, an insulated fast freezing chamber receiving said low temperature fast freezing element to be cooled thereby, and an ice freezing chamber in heat transfer relationship with said ice freezing element and positioned out of heat transfer relationship with said air cooling element.

8. An evaporator comprising an air cooling element, a low temperature fast freezing element, and an ice-freezing element, an insulated fast freezing chamber receiving said low temperature fast freezing element to be cooled thereby, and an ice freezing chamber in heat transfer relationship with said ice freezing element, and means for selectively producing refrigeration in said ice freezing or box-cooling element.

9. A evaporator comprising an air cooling element, a low temperature fast freezing element, and an ice-freezing element, an insulated fast freezing chamber receiving said low temperature fast freezing element to be cooled thereby, and an ice freezing chamber in heat transfer relationship with said ice freezing element, and means for selectively producing refrigeration in said ice freezing or box-cooling element, said last mentioned means being constructed and arranged to prevent substantial production of refrigeration in said box cooling element whenever there is a demand for ice freezing.

10. Refrigerating apparatus comprising a solution circuit including a boiler and an absorber, a pressure equalizing medium circuit including said absorber and an evaporator, means for heating said boiler, means for propelling said pressure equalizing medium through said pressure equalizing medium circuit, a plurality of condition responsive elements for energizing said heating and propelling means, and means operated by one of said elements for rendering another of said elements ineffective.

11. Refrigerating apparatus comprising a solution circuit including a boiler and an absorber, a pressure equalizing medium circuit including said absorber and an evaporator, means for heating said boiler, means for propelling said pressure equalizing medium through said pressure equalizing medium circuit, a plurality of condition responsive elements for energizing said heating and propelling means, a gas lift pump for circulating solution through said solution circuit, and means for diverting a small quantity of gas from said pressure equalizing medium circuit for operating said pump.

12. Refrigerating apparatus comprising a solution circuit including a boiler and an absorber, a pressure equalizing medium circuit including a sectional evaporator and said absorber, power driven means for circulating pressure equalizing medium though its circuit, means for supplying refrigerant vapor generated in said boiler to said evaporator in liquid phase the arrangement being such that the pressure equalizing medium propels the liquid refrigerant through said evaporator sections as it is evaporating, a gas lift pump for circulating absorption solution through said solution circuit, means diverting a portion of the pressure equalizing medium from said pressure equalizing medium circuit for operating said pump, and means responsive to refrigerating demands for regulating the refrigerating effect produced in the various sections of said evaporator.

13. Refrigerating apparatus comprising a cooling unit including a finned air cooling portion, an ice freezing portion, and a fast freezing portion, means for supplying a cooling medium to said cooling unit, a water container in heat transfer relationship with said ice freezing portion at a plurality of points, and an insulated compartment receiving said fast-freezing portion.

14. Refrigerating apparatus comprising a cooling unit including a finned air cooling portion, an ice freezing portion, and a fast freezing portion, means for supplying a cooling medium to said cooling unit, a water container in heat transfer relationship with said ice freezing portion at a plurality of points, an insulated compartment receiving said fast-freezing portion, means for substantially preventing the absorption of heat by said air cooling section, and control means for governing the operation of said last-mentioned means in accordance with refrigeration demand.

15. Refrigerating apparatus comprising a solution circuit including a boiler and an absorber, a pressure equalizing medium circuit including said absorber and an evaporator including a plurality of distinct sections, means for heating said boiler, means for propelling said pressure equalizing medium through said pressure equalizing medium circuit, and a plurality of condition responsive elements for energizing said heating and propelling means, each of which is responsive to conditions produced by different sections of said evaporator.

16. Refrigerating apparatus comprising a solution circuit including a boiler and an absorber, a pressure equalizing medium circuit including said absorber and an evaporator including a plurality of distinct sections, means for heating said boiler, means for propelling a pressure equalizing medium through said pressure equalizing medium circuit, a plurality of condition responsive elements for energizing said heating and propelling means, each of which is responsive to conditions produced by different sections of said evaporator, and means operated by one of said elements for rendering another of said elements ineffective.

17. A refrigerating apparatus including an evaporator having substantially horizontal alternate sections of large cross-sectional area and rising sections of small cross-sectional area, means for supplying a cooling medium to said evaporator, and means for propelling a pressure equalizing medium through said evaporator, the arrangement being such that liquid refrigerant is propelled through the evaporator sections of small cross-sectional area by the pressure equalizing medium.

18. Absorption refrigerating apparatus comprising a solution circuit including a boiler and an absorber, an inert gas circuit including an evaporator and said absorber, power driven means for circulating the inert gas through said inert gas circuit, means for liquifying refrigerant vapor produced in said boiler and for directing the same into the gas inlet portion of said evaporator, said evaporator including an upstanding finned coil and a plurality of substantially horizontal coil sections extending to a level below the upper portion of said upstanding coil and serially connected thereto, said power driven circulating means being arranged to propel the inert gas through said evaporator at a velocity sufficient to sweep or drag the refrigerant liquid therethrough.

19. A refrigerating system including an evaporator, means for propelling a pressure equalizing medium through said evaporator, means for supplying a liquid refrigerant to said evaporator, the arrangement being such that the liquid refrigerant is propelled through the evaporator by said pressure equalizing medium, and means constructed and arranged to inhibit evaporation of said liquid into said pressure equalizing medium as it is being propelled thereby in a selected portion of said evaporator.

20. Refrigerating apparatus comprising an evaporator including a plurality of sections, means for supplying liquid refrigerant to the evaporator, means for propelling pressure equalizing medium through the evaporator under conditions such that the refrigerant is propelled therethrough by the pressure equalizing medium, and means for intermittently rendering one of said evaporator sections inoperative to produce refrigeration whereby said one section alternately operates as an evaporator and as a pump for supplying liquid refrigerant to another evaporator section.

21. Refrigerating apparatus comprising a sectional evaporator, means for supplying liquid refrigerant to the evaporator, means for propelling an inert gas through said evaporator under conditions such that liquid refrigerant will be propelled through the evaporator sections by the inert gas, means responsive to a first condition for controlling the operation of said propelling means and liquid supply means to produce refrigeration in one of said sections, and means responsive to a second condition for controlling the operation of said propelling means and liquid supply means to produce refrigeration in another of said sections.

22. Refrigerating apparatus comprising an evaporator including a pair of distinct sections, means for propelling a pressure equalizing medium serially through said sections, means for supplying liquid refrigerant to said evaporator adjacent the pressure equalizing medium inlet portion thereof, the arrangement being such that the pressure equalizing medium propels the liquid refrigerant through said sections as the refrigerant evaporates into the pressure equalizing medium to produce refrigeration, and means for rendering said evaporator sections selectively operative whereby the first of said sections operates as an evaporator and liquid transfer means at times and as a liquid transfer means only at other times.

23. An absorption refrigerating apparatus comprising a solution circuit including a generator and an absorber, an inert gas circuit including an evaporator and an absorber, means for liquefying refrigerant vapor produced by said generator and for supplying the liquid to said evaporator, said evaporator including alternate sections of large cross sectional area and sections of small cross sectional area, and means in said inert gas circuit arranged to propel inert gas through said evaporator with a velocity and pressure such that the refrigerant liquid is conveyed through the sections of said evaporator of small cross sectional area by the frictional drag of the inert gas.

24. An absorption refrigerating apparatus comprising a solution circuit including a generator and an absorber, an inert gas circuit including an evaporator and an absorber, means for liquefying refrigerant vapor produced by said generator and for supplying the liquid to said evaporator, said evaporator including an ice freezing section and an air cooling section, and means in said inert gas circuit arranged to propel inert gas through said evaporator with a velocity and pressure such that refrigerant liquid is conveyed through at least a portion of each of said evaporator sections by the frictional drag of the inert gas.

25. An absorption refrigerating apparatus comprising a solution circuit including a generator and an absorber, an inert gas circuit including an evaporator and an absorber, means for liquefying refrigerant vapor produced by said generator and for supplying the liquid to said evaporator, said evaporator including an air cooling portion, a low temperature fast freezing portion and an ice freezing portion, said evaporator portions being serially connected in said inert gas circuit in such fashion that the inert gas flows through said air cooling, low temperature and ice freezing portions in that order, means in said inert gas circuit for propelling the inert gas through at least a portion of said evaporator with a velocity sufficient to sweep or drag the refrigerant liquid therethrough, a water container in heat exchange relationship with said ice freezing evaporator portion, and an insulated freezing compartment receiving said fast freezing evaporator portion.

26. In a refrigerating apparatus, an evaporator having an air cooling element, an ice freezing element and a low temperature storage cooling element, a low temperature storage chamber arranged to be refrigerated by said low temperature cooling element, a water container in heat transfer relationship with said ice freezing element, means for supplying a cooling medium to said evaporator and for circulating the cooling medium through said air cooling low temperature cooling and ice freezing elements in the order named, and means for governing the refrigerating effect produced by said ice freezing element including means arranged to render said air cooling element substantially incapable of absorbing heat.

27. A refrigerating apparatus including an evaporator having alternate sections of large and small cross-sectional area, means for supplying a cooling medium to said evaporator, and means for propelling a pressure equalizing medium through said evaporator with sufficient velocity and pressure to propel the cooling medium through said sections of small cross-sectional area, said evaporator sections of large cross-sectional area being inclined slightly to the horizontal to provide for gravity flow of cooling medium therethrough.

28. In an absorption refrigerating apparatus of the type utilizing an absorbent, a refrigerant, and a gaseous medium which is inert with respect to the refrigerant and the absorbent, an evaporator having a plurality of distinct sections including box cooling and ice freezing sections, means for propelling an inert gas through said evaporator sections, and means for supplying liquid refrigerant to said evaporator by gravity independently of the inert gas and adjacent the point at which inert gas enters said evaporator, said evaporator being so constructed and arranged that the refrigerant is propelled through said box cooling and ice freezing evaporator sections by the inert gas.

CURTIS C. COONS.